(12) United States Patent
Kojima

(10) Patent No.: US 8,774,376 B2
(45) Date of Patent: Jul. 8, 2014

(54) DATA TRANSMISSION APPARATUS AND DATA RECEPTION APPARATUS

(75) Inventor: Atsushi Kojima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 339 days.

(21) Appl. No.: 13/304,861

(22) Filed: Nov. 28, 2011

(65) Prior Publication Data

US 2012/0133983 A1    May 31, 2012

(30) Foreign Application Priority Data

Nov. 29, 2010   (JP) ................................. 2010-265195

(51) Int. Cl.
*H04B 7/00* (2006.01)
(52) U.S. Cl.
CPC ....................................... *H04B 7/00* (2013.01)
USPC ............ 379/100.01; 379/100.08; 379/100.17; 358/1.15; 455/68
(58) Field of Classification Search
CPC ..... H04W 7/00; H04W 94/12; H04W 76/022; H04W 76/02; H04B 7/00; H04N 2201/0094; H04N 2201/0096
USPC ............... 379/100.01–100.17; 358/1.15, 401, 358/435, 442; 455/68, 414.1, 412.1, 426.1, 455/466
See application file for complete search history.

(56) References Cited

U.S. PATENT DOCUMENTS

2009/0092106 A1* 4/2009 Nakayama .................... 370/338
2010/0245903 A1* 9/2010 Sakakibara .................. 358/1.15
2010/0245931 A1   9/2010 Sato

FOREIGN PATENT DOCUMENTS

| JP | 10-322461 A | 12/1998 |
|---|---|---|
| JP | 2004-064335 A | 2/2004 |
| JP | 2007-288312 A | 11/2007 |
| JP | 2008-078957 A | 4/2008 |
| JP | 2010-239449 A | 10/2010 |

OTHER PUBLICATIONS

Notification of Reason for Refusal dated Feb. 12, 2014 from related Japanese Application No. 2010-265195, together with an English language translation.

* cited by examiner

*Primary Examiner* — Melur Ramakrishnaiah
(74) *Attorney, Agent, or Firm* — Scully, Scott, Murphy & Presser, PC

(57) ABSTRACT

A data transmission apparatus that wirelessly transmits data to a data reception apparatus storing a first wireless setting, the data transmission apparatus comprises: a memory that stores the first wireless setting; a first check unit that, when specific data is to be transmitted to the data reception apparatus, executes a first check process checking whether the data transmission apparatus is able to perform communication by using a second wireless setting, which is a wireless setting being used; a first change unit that, when it is checked that the data transmission apparatus is not able to perform communication with the data reception apparatus, changes the wireless setting being used by the data transmission apparatus from the second wireless setting to the first wireless setting; and a transmission unit that wirelessly transmits the specific data by using the first wireless setting as the wireless setting being used after changing.

17 Claims, 7 Drawing Sheets

DATA TRANSMISSION APPARATUS AND DATA RECEPTION APPARATUS

CROSS-REFERENCE TO RELATED APPLICATION

This application claims priority from Japanese Patent Application No. 2010-265195 filed on Nov. 29. 2010, the entire subject matter of which is incorporated herein by reference.

TECHNICAL FIELD

The present disclosure relates to a data transmission apparatus that wirelessly transmits data to a data reception apparatus and a data reception apparatus that wirelessly receives the data from a data transmission apparatus.

BACKGROUND

For example, a related art discloses a system including a pair of devices configured to perform wireless communication via an access point. That is, a related art discloses an infrastructure wireless communication technology. In the meantime, a technology has been also known which controls a pair of devices to perform wireless communication without through an access point. That is, an ad hoc wireless communication technology has been also known.

In the infrastructure wireless communication technology and also in the ad hoc wireless communication technology, in order that the pair of devices appropriately performs the wireless communication, it is necessary to set up the same wireless setting (for example, authentication way, encryption way and the like) for each of the devices. That is, when the pair of the devices is set up with different wireless setting, the devices cannot appropriately perform the wireless communication. Also, even when the pair of the devices is set up with the same wireless setting, the devices may not appropriately perform the wireless communication due to the communication environments (for example, a long distance between a device and an access point).

The present disclosure provides a technology to suppress an case, in which a pair of devices cannot appropriately perform wireless communication, from occurring.

SUMMARY

In view of the above, a data transmission apparatus of the present disclosure wirelessly transmits data to a data reception apparatus storing a first wireless setting, and the data transmission apparatus comprising a memory, a first check unit, a first change unit, and a transmission unit. The memory stores the first wireless setting. When specific data is to be transmitted to the data reception apparatus, the first check unit executes a first check process checking whether the data transmission apparatus is able to perform communication with the data reception apparatus by using a second wireless setting, which is a wireless setting being used by the data transmission apparatus, and which is different from the first wireless setting. When it is checked in the first check process that the data transmission apparatus is not able to perform communication with the data reception apparatus, a first change unit changes the wireless setting being used by the data transmission apparatus from the second wireless setting to the first wireless setting. A transmission unit wirelessly transmits the specific data to the data reception apparatus by using the first wireless setting as the wireless setting being used by the data transmission apparatus after the wireless setting being used is changed.

Meanwhile, a data reception apparatus of the present disclosure wirelessly receives data from a data transmission apparatus storing a first wireless setting, the data reception apparatus comprising, a memory, a second check unit, a second change unit, and a reception unit. The memory stores the first wireless setting. The second check unit repeatedly executes a second check process checking whether the data reception apparatus is able to perform communication with the data transmission apparatus by using a second wireless setting, which is a wireless setting being used by the data reception apparatus, and which is different from the first wireless setting. When it is checked in the second check process that the data reception apparatus is not able to perform communication with the data transmission apparatus, the second change unit changes the wireless setting being used by the data reception apparatus from the second wireless setting to the first wireless setting. The reception unit that wirelessly receives specific data from the data transmission apparatus by using the first wireless setting as the wireless setting being used by the data reception apparatus after wireless setting being used is changed.

Further, a control method and a computer program of the data transmission apparatus and a non-transitory computer readable medium storing the computer program are also novel and useful. Also, a control method and a computer program of the data reception apparatus and a non-transitory computer readable medium storing the computer program are also novel and useful. In addition, a wireless communication system having the data transmission apparatus and the data reception apparatus is also novel and useful.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION (Configuration of System)

Figure 1:
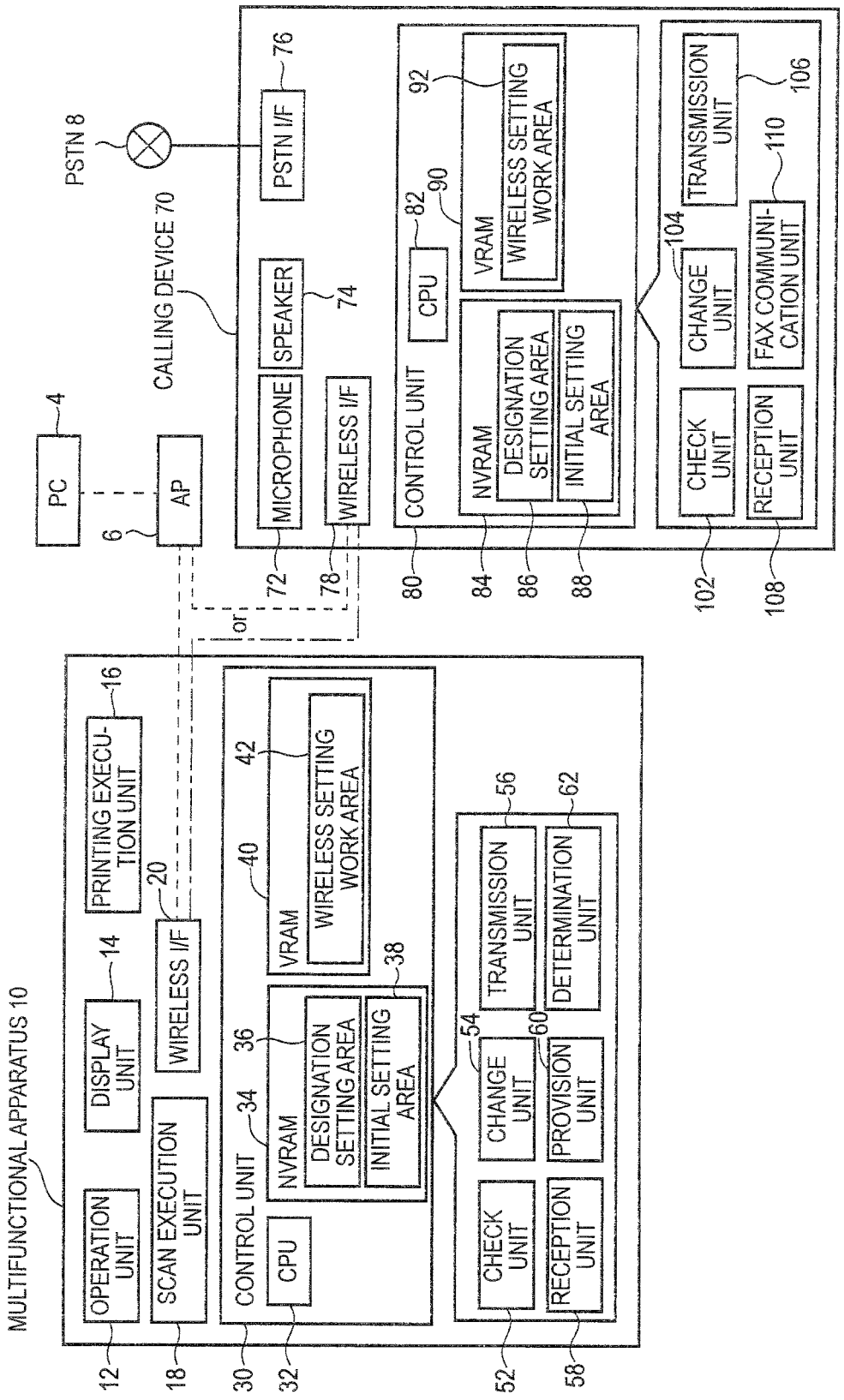
FIG. 1 illustrates a configuration of a wireless communication system according to an exemplary embodiment of the present disclosure.

As shown in FIG. 1, a wireless communication system 2 includes a personal computer (PC) 4, an access point (AP) 6, a multifunctional apparatus 10 and a calling device 70. The PC 4 can perform wireless communication with the other device (for example, multifunctional apparatus 10) through the AP 6. The multifunctional apparatus 10 and the calling device 70 can perform the wireless communication through the AP 6 or without through the AP 6. That is, the multifunctional apparatus 10 and the calling device 70 can perform the infrastructure wireless communication or ad hoc wireless communication. In this exemplary embodiment, the wireless communication is performed based on the standards of IEEE (Institute of Electrical and Electronics Engineers, Inc.) 802.11 and the standards (for example, 802.11a, 11b and the like) based thereon. Accordingly, wireless settings WS1, WS2, WS3, which will be described later, are wireless settings suitable for the above standards.

(Configuration of Multifunctional Apparatus 10)

The multifunctional apparatus (which may be also referred to as a parent device) 10 has an operation unit 12, a display unit 14, a printing execution unit 16, a scan execution unit 18, a wireless interface 20 and a control unit 30. The operation unit 12 has a plurality of keys. A user can operate the operation unit 12 to input various instructions into the multifunctional apparatus 10. The display unit 14 is a display displaying a variety of information. The printing execution unit 16 is a printing mechanism of inkjet and laser ways, for example. The scan execution unit 18 is a scan mechanism of CCD, CIS and the like. The wireless interface 20 is an interface to perform the wireless communication.

The control unit 30 has a CPU 32, an NVRAM (non-volatile memory) 34 and a VRAM (volatile memory) 40. The CPU 32 executes a variety of processes in response to programs stored in a ROM (not shown) of the multifunctional apparatus 10. As the CPU 32 executes the processes in response to the programs, functions of respective units 52 to 62 are realized.

The NVRAM 34 has a designation setting area 36 and an initial setting area 38. The initial setting area 38 is an area to store a wireless setting (i.e., default authentication way, default encryption way, default password and the like) that is preset by a vendor of the multifunctional apparatus 10. Hereinafter, the wireless setting that is stored in the initial setting area 38 is referred to as "initial setting WS1." The initial setting WS1 is previously stored in the multifunctional apparatus 10 at the time of shipment of the multifunctional apparatus 10. The initial setting WS1 is the ad hoc wireless setting to perform the wireless communication without through the AP 6.

When a user wants to use a wireless setting of the multifunctional apparatus 10 different from the initial setting WS1 of the multifunctional apparatus 10, the user can operate the operation unit 12 of the multifunctional apparatus 10 to designate a wireless setting (i.e., authentication way, encryption way, password and the like) that the multifunctional apparatus 10 is to be used. Hereinafter, the wireless setting of the multifunctional apparatus 10 that is designated by the user is referred to as "designated setting WS2." In the meantime, when the multifunctional apparatus 10 is connected to communicate with the PC 4 by wires such as USB cable, the user may operate an operation unit of the PC 4 to designate the designated setting WS2, for example. The designation setting area 36 is an area to store the designated setting WS2. In this exemplary embodiment, the designated setting WS2 is the infrastructure wireless setting to perform the wireless communication through the AP 6. Accordingly, the designated setting WS2 is different from the initial setting WS1 that is the ad hoc wireless setting.

The VRAM 40 has a wireless setting work area 42. The wireless setting work area 42 is a storage area to store a current wireless setting (i.e., wireless setting of the multifunctional apparatus 10 to be currently used) of the multifunctional apparatus 10. The initial setting WS1 is stored in the wireless setting work area 42 after the multifunctional apparatus 10 is shipped until the designated setting WS2 is designated by a user. After the designated setting WS2 is designated by a user, the designated setting WS2 is typically stored in the wireless setting work area 42.

(Configuration of Calling Device 70)

The calling device (which may be also referred to as "child device") 70 is not shipped as a single body and is shipped together with the multifunctional apparatus 10. The calling device 70 has a microphone 72, a speaker 74, a PSTN interface 76, a wireless interface 78 and a control unit 80. Since the calling device 70 has the microphone 72 and the speaker 74, the user can execute telephone communication through the PSTN 8 by using the calling device 70. The PSTN interface 76 is connected to the PSTN (Public Switched Telephone Network) 8. Specifically, the PSTN interface 76 is connected with an end of a PSTN cable. The other end of the PSTN cable is connected to a socket of PSTN in the house, for example. The wireless interface 78 is an interface to perform the wireless communication.

The control unit 80 has a CPU 82, an NVRAM 84 and a VRAM 90. The CPU 82 executes a variety of processes in response to programs stored in a ROM (not shown) of the calling device 70. As the CPU 82 executes the processes in response to the programs, functions of respective units 102 to 112 are realized.

The NVRAM 84 has a designation setting area 86 and an initial setting area 88. The initial setting area 88 is an area to store the same ad hoc wireless setting as the multifunctional apparatus 10. The initial setting WS1 is previously stored in the calling device 70 at the time of shipment of the calling device 70 (i.e., at the time of shipment of the multifunctional apparatus 10).

When a user wants to use a wireless setting of the calling device 70 different from the initial setting WS1, the user can operate the operation unit 12 of the multifunctional apparatus 10 to designate a wireless setting (i.e., authentication way, encryption way, password and the like) that the calling device 70 is to be used. Hereinafter, the wireless setting of the calling device 70 that is designated by the user is referred to as "designated setting WS3." When the designated setting WS3 of the calling device 70 is designated, the multifunctional apparatus 10 wirelessly transmits the designated setting WS3 to the calling device 70 by using the current wireless setting (for example, initial setting WS1) of the multifunctional apparatus 10. Thereby, the calling device 70 can acquire the designated setting WS3. In the meantime, when the multifunctional apparatus 10 and the PC 4 are connected to communicate with each other by the wires such as USB cable, the user may operate the operation unit of the PC 4 to designate the designated setting WS3. Also, in a modified embodiment, a configuration may be adopted in which the user operates an operation unit (not shown) of the calling device 70 to input the designated setting WS3 to the calling device 70.

The designation setting area 86 is a storage area to store the designated setting WS3. In this exemplary embodiment, the designated setting WS3 is the infrastructure wireless setting. Accordingly, the designated setting WS3 is different from the ad hoc initial setting WS1.

The VRAM 90 has a wireless setting work area 92. The wireless setting work area 92 is a storage area to store a current wireless setting (i.e. wireless setting of the calling device 70 to be currently used) of the calling device 70. The initial setting WS1 is stored in the wireless setting work area 92 after the calling device 70 is shipped together with the multifunctional apparatus 10 until the designated setting WS3 is designated by a user. After the designated setting WS3 is designated by a user, the designated setting WS3 is typically stored in the wireless setting work area 92. Like this, at the time of shipment, the multifunctional apparatus 10 and the calling device 70 have the initial setting WS1 as the wireless setting thereof, respectively and can communicate with each other.

(FAX Function)

The multifunctional apparatus 10 executes a process in cooperation with the calling device 70 so that a FAX function is performed. For example, when the calling device 70 receives FAX data through the PSTN interface 76, it wirelessly transmits the FAX data to the multifunctional apparatus 10. When the FAX data wirelessly transmitted from the calling device 70 is received through the wireless interface 20, the multifunctional apparatus 10 controls the printing execution unit 16 to print an image that is expressed by the FAX data. Thereby, an operation of receiving the FAX data is executed.

Also, the multifunctional apparatus 10 wirelessly transmits FAX data, which is generated as the scan execution unit 18 scans a document, to the calling device 70. When the FAX data, which is wirelessly transmitted from the multifunctional apparatus 10, is received through the wireless interface 78, the calling device 70 transmits the FAX data to a destination, which is previously designated by a user, through the PSTN 8. Thereby, an operation of transmitting the FAX data is executed.

In the meantime, while the multifunctional apparatus 10 has the function of providing (i.e., printing) an image, which is expressed by the FAX data received through the PSTN 8, to the user, the calling device 70 does not have the corresponding function. Also, while the multifunctional apparatus 10 has the function of scanning a document and thus generating FAX data to be transmitted through the PSTN 8, the calling device 70 does not have the corresponding function. In other words, the calling device 70 can receive the FAX data through the PSTN 8 instead of the multifunctional apparatus 10 and can transmit the FAX data through the PSTN 8 instead of the multifunctional apparatus 10. Accordingly, it can be said that the calling device 70 is an auxiliary apparatus of the multifunctional apparatus 10. In this exemplary embodiment, the multifunctional apparatus 10 prints an image expressed by the FAX data, thereby providing the image to the user. However, in a modified embodiment, the multifunctional apparatus 10 may display an image expressed by the FAX data, thereby providing the image to the user. Generally speaking, the provision to the user means at least one of the printing and the display.

As described above, the calling device 70 is an auxiliary apparatus of the multifunctional apparatus 10 and does not have the printing execution unit 16 and the scan execution unit 18. Accordingly, compared to the multifunctional apparatus 10, the calling device 70 has a small size. Typically, a position of the socket of PSTN is determined in a house. If a configuration in which the PSTN cable is to be connected to the multifunctional apparatus 10 is applied, it is necessary to arrange the multifunctional apparatus 10 near the socket of PSTN. Since the multifunctional apparatus 10 has a relatively large size, it is difficult to arrange the multifunctional apparatus 10 near the socket of PSTN under environments in which a space is narrow near the socket of PSTN. In this exemplary embodiment, the PSTN interface 76 is provided to the calling device 70 having a relatively small size. Accordingly, even under environments in which a space is narrow near the socket of PSTN, it is possible to easily arrange the calling device 70 near the socket of PSTN and to thus connect the calling device 70 to the PSTN 8. In addition, it is possible to freely locate the multifunctional apparatus 10 without being limited to the adjacent position to the socket of PSTN.

(Process that is Executed by Multifunctional Apparatus 10)

Subsequently, a process that is executed by the multifunctional apparatus 10 is described with reference to a flowchart of FIG. 2. When the multifunctional apparatus 10 becomes ON, the control unit 30 starts the process of the flowchart shown in FIG. 2. In the meantime, when the multifunctional apparatus 10 becomes ON, the control unit 30 resets and starts a check timer that is embedded in the control unit 30. Also, when the multifunctional apparatus 10 becomes ON, if the designated setting WS2 is stored in the designation setting area 36, the control unit 30 stores the designated setting WS2 in the wireless setting work area 42. On the other hand, when the multifunctional apparatus 10 becomes ON, if the designated setting WS2 is not stored in the designation setting area 36 (i.e., the designated setting WS2 is not designated yet), the control unit 30 stores the initial setting WS1 in the wireless setting work area 42.

(Processes Step S10 to Step S20 about Transmission of Communication Check)

First, in step S10, a check unit 52 (refer to FIG. 1) determines whether a value of the check timer is larger than a predetermined value T1. When a value of the check timer is a predetermined value T1 or smaller (NO in step S10), the process proceeds to step S22. When a value of the check timer is larger than a predetermined value T1 (YES in step S10), the process proceeds to step S12. In step S12, the check unit 52 wirelessly transmits a communication check by using the current wireless setting (i.e., initial setting WS1 or designated setting WS2) of the multifunctional apparatus 10 stored in the wireless setting work area 42. Then, in step S13, the check unit 52 resets and starts the check timer.

Then, in step S14, the check unit 52 determines whether a response to the communication check transmitted in step S12 is wirelessly received. That is, the check unit 52 checks whether the multifunctional apparatus can communicate with the calling device 70 by using the current wireless setting of the multifunctional apparatus 10. When the response is received in a predetermined time period after transmitting the communication check in step S12, the check unit 52 checks that the multifunctional apparatus can communicate with the calling device 70 (YES in step S14), and the process proceeds to step S22 without a change of the current wireless setting (i.e., initial setting WS1 or designated setting WS2). On the other hand, when the response is not received in the predetermined time period after transmitting the communication check in step S12, the check unit 52 checks that the multifunctional apparatus cannot communicate with the calling device 70 (NO in step S14) and the process proceeds to step S16.

In step S16, the check unit 52 determines whether the current wireless setting of the multifunctional apparatus 10 is the initial setting WS1. Specifically, the check unit 52 compares the wireless setting stored in the wireless setting work area 42 with the initial setting WS1 stored in the initial setting area 38. When the wireless settings of the wireless setting work area 42 and the initial setting area 38 coincide with each other, the check unit 52 determines that the current wireless setting of the multifunctional apparatus 10 is the initial setting WS1 (YES in step S16) and the process proceeds to step S22. On the other hand, when the wireless settings of the wireless setting work area 42 and the initial setting area 38 do not coincide with each other, the check unit 52 determines that the current wireless setting of the multifunctional apparatus 10 is not the initial setting WS1, i.e., that the current wireless setting of the multifunctional apparatus 10 is the designated setting WS2 (NO in step S16), and the process proceeds to step S18.

In step S18, a change unit 54 (refer to FIG. 1) changes the current wireless setting of the multifunctional apparatus 10 from the designated setting WS2 to the initial setting WS1. Specifically, the change unit 54 changes the information, which is stored in the wireless setting work area 42, from the designated setting WS2 to the initial setting WS1 in the initial setting area 38. Like this, when the check unit 52 checks that the multifunctional apparatus 10 cannot communicate with the calling device 70 and that the current wireless setting of the multifunctional apparatus 10 is the designated setting WS2, the wireless setting of the multifunctional apparatus 10 is changed from the designated setting WS2 to the initial setting WS1. Then, in step S20, the change unit 54 resets and starts an initial timer that is embedded in the control unit 30. After completing step S20, the process proceeds to step S22.
(Processes Step S22 and Step S24 about Reception of Communication Check)

As described later, the calling device 70 wirelessly transmits a communication check to the multifunctional apparatus 10 (refer to step S112, step S144 and step S152 of FIG. 3). In this case, under situations in which the multifunctional apparatus 10 and the calling device 70 can appropriately perform the wireless communication, the control unit 30 of the multifunctional apparatus 10 wirelessly receives the communication check by using the current wireless setting of the multifunctional apparatus 10 and thus determines YES in step S22. In the meantime, the situations, in which the multifunctional apparatus 10 and the calling device 70 can appropriately perform the wireless communication, include following cases, for example. For instance, it is a case in which the same wireless setting (which may be the initial setting WS1 or designated setting WS2) is set up for both the multifunctional apparatus 10 and the calling device 70 and the multifunctional apparatus 10 receives a response from the calling device 70 (YES in step S14) regarding the communication check of step S12. Also, for example, it is a case in which, since the designated setting WS2 is set up as the wireless setting of the multifunctional apparatus 10 and the initial setting WS1 is set up as the wireless setting of the calling device 70, the multi-function apparatus 10 does not receive a response from the calling device 70 (NO in step S14) regarding the communication check of step S12 and then the wireless setting of the multifunctional apparatus 10 is resultantly changed from the designated setting WS2 to the initial setting WS1 in step S18. When a result of the determination in step S22 is YES, the control unit 30 wirelessly transmits the response to the communication check by using the current wireless setting of the multifunctional apparatus 10, in step S24. When a result of the determination in step S22 is NO, or after completing step S24, the process proceeds to step S26.
(Processes Step S26 to Step S30 about Reception of FAX Data Through PSTN 8)

As specifically described later, the calling device 70 wirelessly transmits the FAX data (hereinafter, referred to as "FAX data of a printing target") received through the PSTN 8 to the multifunctional apparatus 10 (refer to step S158 of FIG. 3). In this case, under situations in which the multifunctional apparatus 10 and the calling device 70 can appropriately perform the wireless communication, a reception unit 58 (refer to FIG. 1) receives the FAX data of a printing target from the calling device 70 by using the current wireless setting of the multifunctional apparatus 10 and determines YES in step S26. In this case, in step S28, a provision unit 60 (refer to FIG. 1) controls the printing execution unit 16 to execute a printing of an image that is expressed by the FAX data of a printing target. Thereby, the image is provided to the user.

In the meantime, when the current wireless setting of the multifunctional apparatus 10 is the initial setting WS1 as the process of step S18 is executed, the change unit 54 changes the current wireless setting of the multifunctional apparatus 10 from the initial setting WS1 to the designated setting WS2 (i.e., the change unit returns the current wireless setting from the initial setting WS1 to the designated setting WS2), in step S30. Specifically, the change unit 54 changes the information, which is stored in the wireless setting work area 42, from the initial setting WS1 to the designated setting WS2 in the designation setting area 36. Like this, even when the current wireless setting of the multifunctional apparatus 10 is changed from the designated setting WS2 to the initial setting WS1 in step S18, after the multifunctional apparatus 10 receives the FAX data from the calling device 70 (YES in step S26), the current wireless setting of the multifunctional apparatus 10 is returned to the designated setting WS2 before the change. In step S30, the change unit 54 resets the initial timer. When a result of the determination in step S26 is NO or when completing step S30, the process proceeds to step S32. On the other hand, when the current wireless setting of the multifunctional apparatus 10 is the initial setting WS1 without the execution of the process of step S18 (for example, when the designated setting WS2 is not designated yet), the control unit skips over step S30 and proceeds to step S32.
(Processes Step S32 and Step S34 about Monitoring of Initial Timer)

In step S32, a determination unit 62 (refer to FIG. 1) determines whether a value of the initial timer is larger than a predetermined value T2. When a value of the initial timer is a predetermined value T2 (for example, one minute) or smaller (NO in step S32), the process proceeds to step S40 without going through step S34. When a value of the initial timer is larger than a predetermined value T2 (YES in step S32), the process proceeds to step S34. In step S34, like step S30, the change unit 54 changes the current wireless setting of the multifunctional apparatus 10 from the initial setting WS1 to the designated setting W52. That is, the initial setting WS1 is maintained after the current wireless setting of the multifunctional apparatus 10 is changed to the initial setting WS1 in step S18 and the initial timer starts in step S20 until the predetermined time period T2 elapses. At this time, when the communication check is received in step S22 and the FAX data is received in step S26 after the initial timer starts until the predetermined time period T2 elapses, the initial setting WS1 is maintained until the printing of the FAX data is completed. Also, although the predetermined time period T2 elapses after the initial timer starts in step S20, when the communication check is not received (NO in step S22) and the FAX data is not received (NO in step S26), the multifunctional apparatus 10 determines that there is no transmission of the FAX data from the calling device 70 to the multifunctional apparatus 10 and thus returns the current wireless setting to the designated setting WS2. In step S34, the change unit 54 resets the initial timer. When completing step S34, the process proceeds to step S40.

(Processes step S40 to Step S60 about Transmission of FAX Data Through PSTN 8)

In step S40, the check unit 52 determines whether the FAX transmission operation (i.e., an operation for designating a destination and an operation of a scan execution button) is executed through the operation unit 12 of the multifunctional apparatus 10. When the FAX transmission operation is not executed (NO in step S40), the process returns to step S10, and when the FAX transmission operation is executed (YES in step S40), the process proceeds to step S42. In step S42, the control unit 30 controls the scan execution unit 18 to scan a document. Thereby, FAX data (hereinafter, referred to as "transmission target FAX data) to be transmitted through the PSTN 8 is generated.

Then, in step S44, the check unit 52 wirelessly transmits a communication check to the calling device 70 by using the current wireless setting of the multifunctional apparatus 10. Then, in step S46, like step S14, the check unit 52 determines whether a response to the communication check transmitted in step S44 is wirelessly received. When it is checked that the multifunctional apparatus can communicate with the calling device 70 (YES in step S46), the process proceeds to step S58. When it is checked that the multifunctional apparatus cannot communicate with the calling device 70 (NO in step S46), the process proceeds to step S48.

In step S48, like step S16, the check unit 52 determines whether the current wireless setting of the multifunctional apparatus 10 is the initial setting WS1. When the current wireless setting of the multifunctional apparatus 10 is the initial setting WS1 (YES in step S48), the process proceeds to step S52. On the other hand, when the current wireless setting of the multifunctional apparatus 10 is not the initial setting WS1, i.e., the current wireless setting of the multifunctional apparatus 10 is the designated setting WS2 (NO in step S48), the process proceeds to step S50. In step S50, like step S18, the change unit 54 changes the current wireless setting of the multifunctional apparatus 10 from the designated setting WS2 to the initial setting WS1. Like this, when the check unit 52 checks that the multifunctional apparatus cannot communicate with the calling device 70 and that the current wireless setting of the multifunctional apparatus 10 is the designated setting WS2, the wireless setting of the multifunctional apparatus 10 is changed from the designated setting WS2 to the initial setting WS1.

Then, in step S52, the check unit 52 wirelessly transmits a communication check by using the current wireless setting (i.e., the initial setting WS1) of the multifunctional apparatus 10. Then, in step S54, like step S14, the check unit 52 determines whether a response to the communication check transmitted in step S52 is received. When it is checked that the multifunctional apparatus can communicate with the calling device 70 (YES in step S54), the process proceeds to step S58. When it is checked that the multifunctional apparatus cannot communicate with the calling device 70 (NO in step S54), the process proceeds to step S56. In step S56, the control unit 30 executes an error process. Specifically, the control unit 30 displays information, which indicates that the transmission of the FAX data through the PSTN 8 cannot be executed, on the display unit 14. When completing step S56, the process returns to step S10.

In step S58, a transmission unit 56 (refer to FIG. 1) wirelessly transmits the FAX data of a transmission target generated in step S42 to the calling device 70 by using the current wireless setting of the multifunctional apparatus 10. In the meantime, in step S60, when the current wireless setting of the multifunctional apparatus 10 is the initial setting WS1 as the process of step S50 is executed, the change unit 54 changes the current wireless setting of the multifunctional apparatus 10 from the initial setting WS1 to the designated setting WS2, like step S30. When completing step S60, the process returns to step S10. On the other hand, when the process of step S50 is not executed and the current wireless setting of the multifunctional apparatus 10 is the initial setting WS1 (for example, when the designated setting WS2 is not designated yet), the control unit skips over step S60 and returns to step S10. Also, for example, when the current wireless setting of the multifunctional apparatus 10 is changed to the initial setting WS1 in step S18 and when the FAX transmission operation is executed (YES in step S40) at the state in which the value of the initial timer is the predetermined value T2 or smaller (NO in step S32), a result of the determination in step S48 is YES, so that the process of step S50 is not executed. Accordingly, also in this case, the process of step S60 is not executed. As a result, the initial setting WS1 is maintained as the current wireless setting of the multifunctional apparatus 10 until the value of the initial timer exceeds the predetermined value T2 (YES in step S32). At this time, when the communication check is received in step S22 and the FAX data is received from the calling device 70 in step S26, the initial setting WS1 is maintained until the printing of the FAX data is completed.

(Process that is Executed by Calling Device 70)

In the below, the process that is executed by the calling device 70 is described with reference to a flowchart of FIG. 3. Like the multifunctional apparatus 10, when the calling device 70 becomes ON, the control unit 80 resets and starts a check timer that is embedded in the control unit 80. Also, when the designated setting WS3 is stored in the designation setting area 86, the control unit 80 stores the designated setting WS3 in the wireless setting work area 92. When the designated setting WS3 is not stored in the designation setting area 86, the control unit 80 stores the initial setting WS1 in the wireless setting work area 92.

Meanwhile, since many processes of step S110 to step S160 of FIG. 3 have the same as the processes of step S10 to step S60 of FIG. 2, the processes of step S110 to step S160 are briefly described in the below. The detailed processes of step S110 to step S160 of FIG. 3 can be easily understood with reference to the processes of step S10 to step S60 of FIG. 2.

(Processes Step S110 to Step S118 about Transmission of Communication Check)

First, in step S110, a check unit 102 (refer to FIG. 1) determines whether a value of the check timer is larger than a predetermined value T3. When a value of the check timer is a predetermined value T3 (for example, five minutes) or smaller (NO in step S110), the process proceeds to step S122. When a value of the check timer is larger than a predetermined value T3 (YES in step S110), the process proceeds to step S112. In step S112, the check unit 102 wirelessly transmits a communication check by using the current wireless setting (i.e., initial setting WS1 or designated setting WS3) of the calling device 70 stored in the wireless setting work area 92. Then, in step S113, the check unit 102 resets and starts the check timer.

Then, in step S114, the check unit 102 determines whether a response to the communication check transmitted in step S112 is wirelessly received. When it is checked that the calling device cannot communicate with the multifunctional apparatus 10 (NO in step S114), in step S116, the check unit 102 determines whether the current wireless setting of the calling device 70 is the initial setting WS1. When the current wireless setting of the calling device 70 is not the initial setting WS1, i.e., the current wireless setting of the calling device 70 is the designated setting WS3 (NO in step S116), a change unit 104 (refer to FIG. 1) changes the current wireless setting of the calling device 70 from the designated setting WS3 to the initial setting WS1, in step S118. Like this, when the check unit 102 checks that the calling device cannot communicate with the multifunctional apparatus 10 and when the check unit determines that the current wireless setting of the calling device 70 is the designated setting WS3, the wireless setting of the calling device 70 is changed from the designated setting WS3 to the initial setting WS1. In the meantime, differently from a above-described case of the multifunctional apparatus 10, the initial timer is not used in the calling device 70 (refer to step S20 of FIG. 2). In the meantime, when a result of the determination in step S114 is YES, when a result of the determination in step S116 is YES or when completing step S118, the process proceeds to step S122.

(Processes Step S122 and Step S124 about Reception of Communication Check)

Figure 2:
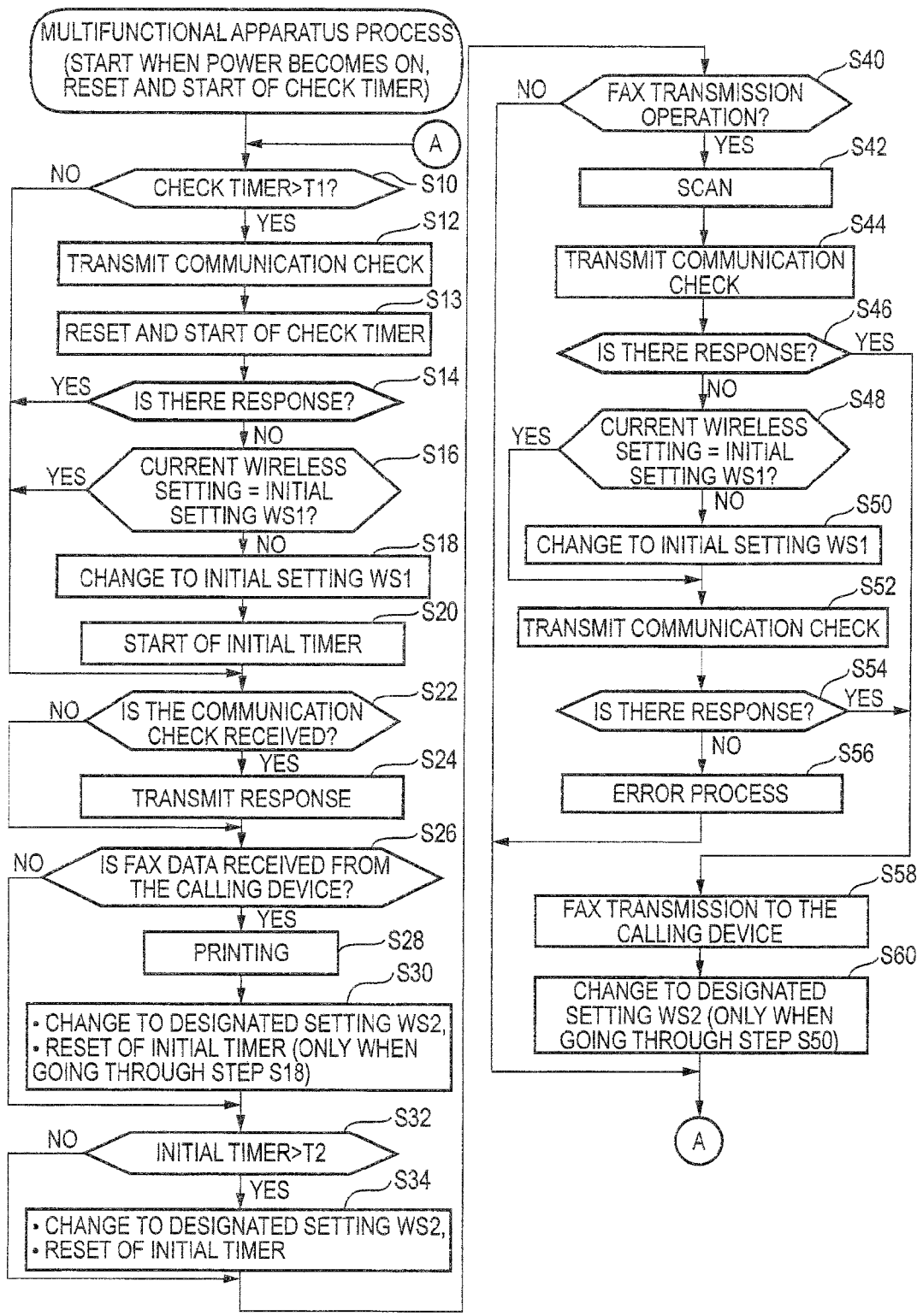
FIG. 2 illustrates a flowchart of a process that is executed by a multifunctional apparatus.

As described above, the multifunctional apparatus 10 wirelessly transmits the communication check to the calling device 70 (refer to step S12, step S44 and step S52 of FIG. 2). In this case, under situations in which the multifunctional apparatus 10 and the calling device 70 can appropriately perform the wireless communication, the control unit 80 of the calling device 70 determines YES in step S122 and wirelessly transmits a response to the communication check by using the current wireless setting of the calling device 70. In the meantime, the situations, in which the multifunctional apparatus 10 and the calling device 70 can appropriately perform the wireless communication, include following cases, for example. For instance, it is a case in which the same wireless setting (which may be the initial setting WS1 or designated setting WS2) is set up for both the multifunctional apparatus 10 and the calling device 70 and the calling device 70 receives the response from the multifunctional apparatus 10 (YES in step S114) regarding the communication check of step S112. Also, for example, it is a case in which, since the initial setting WS1 is set up as the wireless setting of the multifunctional apparatus 10 and the designated setting WS3 is set up as the wireless setting of the calling device 70, the calling device 70 does not receive a response from the multifunctional apparatus 10 (NO in step S114) regarding the communication check of step S112 and the wireless setting of the calling device 70 is resultantly changed from the designated setting WS3 to the initial setting WS1 in step S118. When a result of the determination in step S122 is NO or after completing step S124, the process proceeds to step S126.

(Processes Step S126 to Step S130 about Reception of FAX Data Through PSTN 8)

As described above, the multifunctional apparatus 10 wirelessly transmits the FAX data of a transmission target to the calling device 70 (refer to step S58 of FIG. 2). In this case, under situations in which the multifunctional apparatus 10 and the calling device 70 can appropriately perform the wireless communication, a reception unit 108 (refer to FIG. 1) receives the FAX data of a transmission target from the multifunctional apparatus 10 by using the current wireless setting of the calling device 70 and determines YES in step S126. In the meantime, in step S126, the reception unit 108 also wirelessly receives the destination (i.e., FAX identification information (for example, FAX number)) that is designated by the user. Then, in step S128, a FAX communication unit 110 (refer to FIG. 1) makes a call the destination received from the multifunctional apparatus 10 by using the PSTN interface 76. Thereby, a call is established between the calling device 70 and the destination. Then, the FAX communication unit 110 transmits the FAX data of a transmission target through the PSTN 8.

In the meantime, when the current wireless setting of the calling device 70 is the initial setting WS1 as the process of step S118 is executed, the change unit 104 changes the current wireless setting of the calling device 70 from the initial setting WS1 to the designated setting WS3, in step S130. Like this, even when the current wireless setting of the calling device 70 is changed from the designated setting WS3 to the initial setting WS1 in step S118, after the calling device 70 receives the FAX data from the multifunctional apparatus 10 (YES in step S126), the current wireless setting of the calling device 70 is returned to the designated setting WS3 before the change. When a result of the determination in step S126 is NO or when completing step S130, the process proceeds to step S140.

(Processes Step S140 to Step S160 about Reception of FAX Data Through PSTN 8)

When the FAX data of a printing target is transmitted from another facsimile apparatus to the calling device 70 through the PSTN 8, the FAX communication unit 110 receives the FAX data of a printing target and determines YES in step S140. In this case, in step S144, the check unit 102 wirelessly transmits a communication check to the multifunctional apparatus 10 by using the current wireless setting of the calling device 70.

Then, in step S146, the check unit 102 determines whether a response to the communication check transmitted in step S144 is wirelessly received. When it is checked that the calling device cannot communicate with the multifunctional apparatus 10 (NO in step S146), in step S148, the check unit 102 determines whether the current wireless setting of the calling device 70 is the initial setting WS1. When the current wireless setting of the calling device 70 is the initial setting WS1 (YES in step S148), the process proceeds to step S152. On the other hand, when the current wireless setting of the calling device 70 is not the initial setting WS1, i.e., when the current wireless setting of the calling device 70 is the designated setting WS3 (NO in step S148), the process proceeds to step S150. In step S150, the change unit 104 changes the current wireless setting of the calling device 70 from the designated setting WS3 to the initial setting WS1. Like this, when the check unit 102 checks that the calling device cannot communicate with the multifunctional apparatus 10 and when the check unit determines that the current wireless setting of the calling device 70 is the designated setting WS3, the wireless setting of the calling device 70 is changed from the designated setting WS3 to the initial setting WS1.

Then, in step S152, the check unit 102 wirelessly transmits a communication check by using the current wireless setting (i.e., initial setting WS1) of the calling device 70. Then, in step S154, the check unit 102 determines whether a response to the communication check transmitted in step S152 is wirelessly received. When it is checked that the calling device cannot communicate with the multifunctional apparatus 10 (NO in step S154), the control unit 80 transmits information, which indicates that it is not possible to execute the printing of the FAX data of a printing target, to a transmission source of the FAX data of a printing target, in step S156. When completing step S156, the process returns to step S110. On the other hand, when a result of the determination in step S146 is YES or when a result of the determination in step S154 is YES, the process proceeds to step S158.

In step S158, a transmission unit 106 (refer to FIG. 1) wirelessly transmits the FAX data of a printing target to the multifunctional apparatus 10 by using the current wireless setting of the calling device 70. In the meantime, when the current wireless setting of the calling device 70 is the initial setting WS1 as the process of step S150 is executed, in step S160, the change unit 104 changes the current wireless setting of the calling device 70 from the initial setting WS1 to the designated setting WS3. When completing step S160, the process returns to step S110.

(Illustrative Cases)

In the below, illustrative cases that are performed by the multifunctional apparatus 10 and the calling device 70 are described. The below cases are realized as the multifunctional apparatus 10 and the calling device 70 execute the flowcharts of FIGS. 2 and 3.

(Case A)

First, a case A is described with reference to FIGS. 4 and 5, in which the FAX data of a printing target is received through the PSTN 8. As described above, before a user designates the designated setting WS2 and the designated setting WS3, the respective current wireless settings of the multifunctional apparatus 10 and the calling device 70 are the same ad hoc setting of the initial setting WS1.

Figure 3:
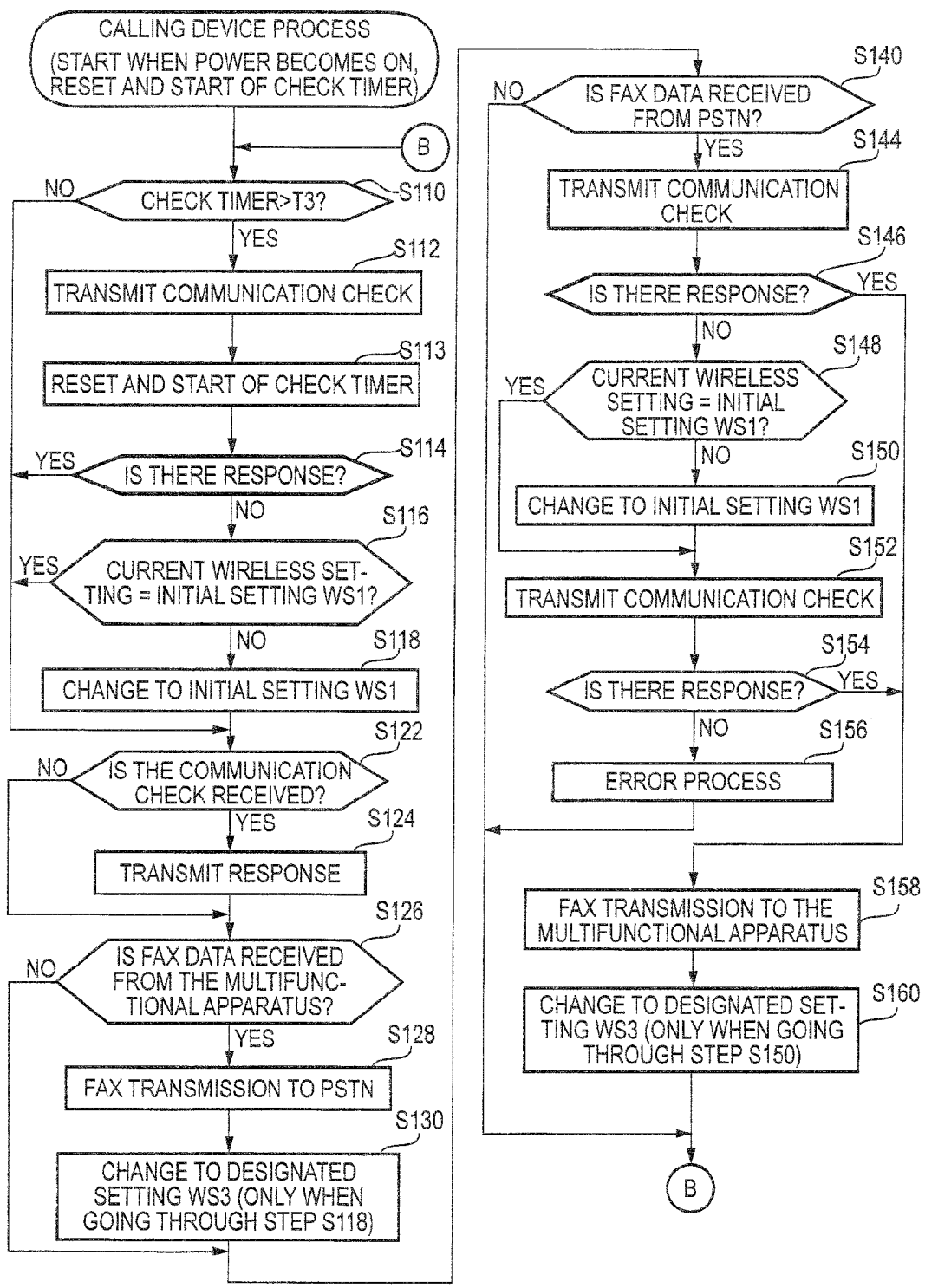
FIG. 3 illustrates a flowchart of a process that is executed by a calling device.
Figure 4:
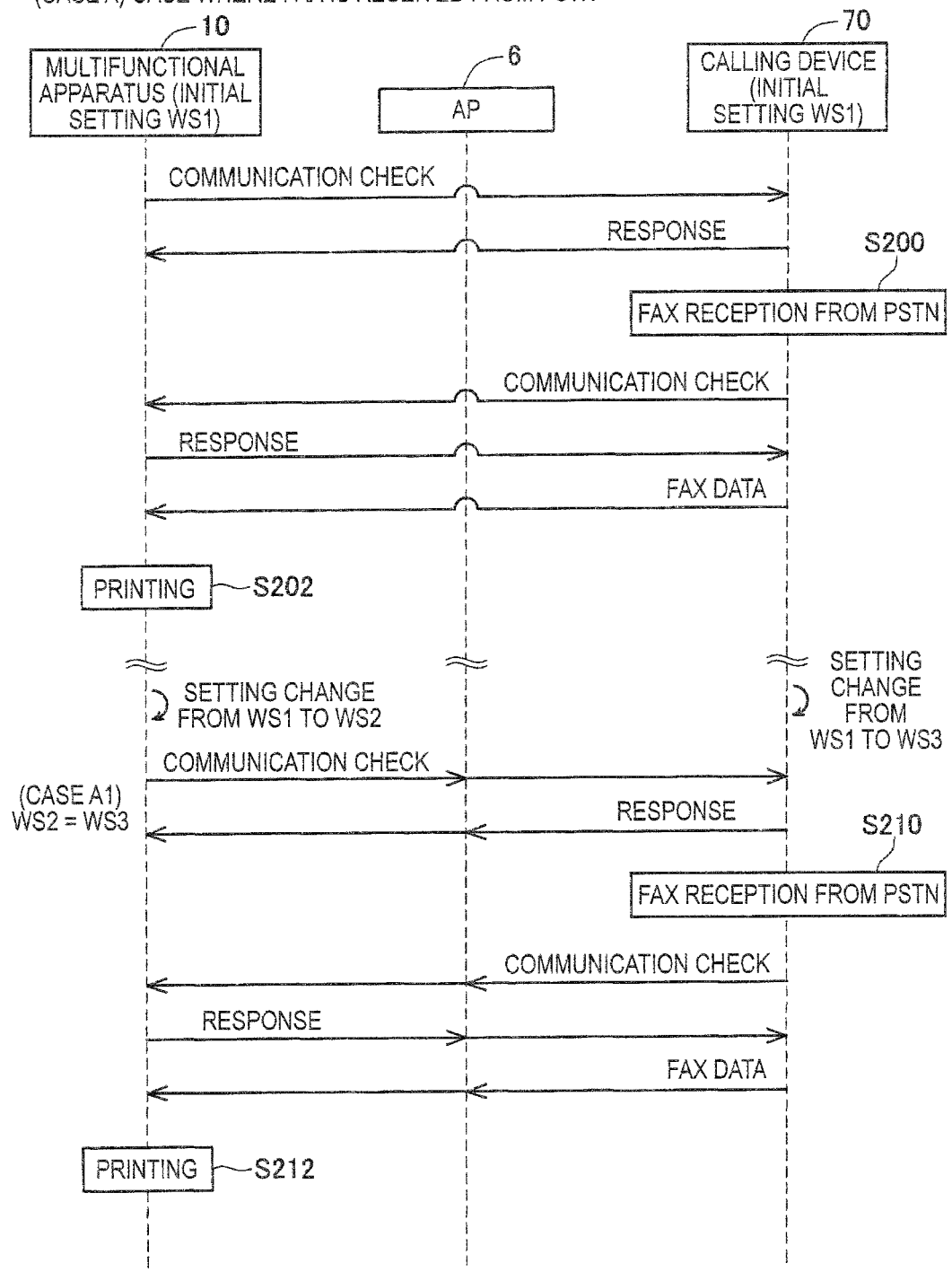
FIG. 4 illustrates an example in which the calling device receives FAX data through the PSTN when the same wireless setting is set up for both the multifunctional apparatus and the calling device.

As shown in FIG. 4, the check unit 52 of the multifunctional apparatus 10 wirelessly transmits a communication check to the calling device 70 by using the initial setting WS1 whenever a value of the check timer becomes larger the predetermined value T1 (S10 in FIG. 2). That is, the check unit 52 of the multifunctional apparatus 10 repeats to wirelessly transmit the communication check to the calling device 70. The control unit 80 of the calling device 70 receives the communication check from the multifunctional apparatus 10 without through the AP 6 by using the initial setting WS1 (YES in step S122 of FIG. 3). In this case, the control unit 80 of the calling device 70 wirelessly transmits a response to the communication check to the multifunctional apparatus 10 by using the initial setting WS1 (S124 in FIG. 3). The check unit 52 of the multifunctional apparatus 10 receives the response to the communication check without through the AP 6 by using the initial setting WS1 (YES in step S14 of FIG. 2). As a result, the initial setting WS1 is maintained as the current wireless setting of the multifunctional apparatus 10.

In step S200, the FAX communication unit 110 of the calling device 70 receives the FAX data of a printing target through the PSTN 8 (YES in step S140 of FIG. 3). In this case, the check unit 102 of the calling device 70 wirelessly transmits a communication check to the multifunctional apparatus 10 by using the initial setting WS1 (S144 of FIG. 3). The control unit 30 of the multifunctional apparatus 10 receives the communication check from the calling device 70 without through the AP 6 by using the initial setting WS1 (YES in step S22 of FIG. 2). In this case, the control unit 30 of the multifunctional apparatus 10 wirelessly transmits a response to the communication check to the calling device 70 by using the initial setting WS1 (S24 of FIG. 2). Thereby, the check unit 102 of the calling device 70 receives the response to the communication check without through the AP 6 by using the initial setting WS1 (YES in step S146 of FIG. 3).

Then, the transmission unit 106 of the calling device 70 wirelessly transmits the FAX data of a printing target to the multifunctional apparatus 10 by using the initial setting WS1 (S158 of FIG. 3). The reception unit 58 of the multifunctional apparatus 10 wirelessly receives the FAX data of a printing target without through the AP 6 by using the initial setting WS1 (YES in step S26 of FIG. 2). Then, in step S202, the provision unit 60 of the multifunctional apparatus 10 controls the printing execution unit 16 to print an image that is expressed by the FAX data of a printing target (S28 of FIG. 2).

(Setting Change)

For example, a user may want to establish a system in which the multifunctional apparatus 10 and the PC 4 can perform the wireless communication through the AP 6. In this case, the user designates the infrastructure designated setting WS2 as the wireless setting of the multifunctional apparatus 10. Thus, since the designated setting WS2, which is the current wireless setting of the multifunctional apparatus 10, and the initial setting WS1, which is the current wireless setting of the calling device 70, are different, the multifunctional apparatus 10 and the calling device 70 cannot perform the communication. Accordingly, the user further designates the infrastructure designated setting WS3 as the wireless setting of the calling device 70. At this time, when the user appropriately designates the wireless setting of the calling device 70 as the same designated setting WS3 as the designated setting WS2, a following case A1 is performed. To the contrary, when the user erroneously designates the wireless setting of the calling device 70 as the designated setting WS3 different from the designated setting WS2, a case A2 of FIG. 5 is performed.

(Case A1)

In the case A1, the multifunctional apparatus 10 and the calling device 70 can appropriately perform the wireless communication through the AP 6 by using the designated settings WS2, WS3. Accordingly, except that the wireless communication is performed through the AP 6, this case is the same as the above case in which the wireless communication is performed using the initial setting WS1. That is, the communication check, the response to the communication check and the FAX data of a printing target are appropriately communicated through the AP 6 between the multifunctional apparatus 10 and the calling device 70. Therefore, the image that is expressed by the FAX data of a printing target received through the PSTN 8 in step S210 is appropriately printed in step S212.

(Case A2)

Figure 5:
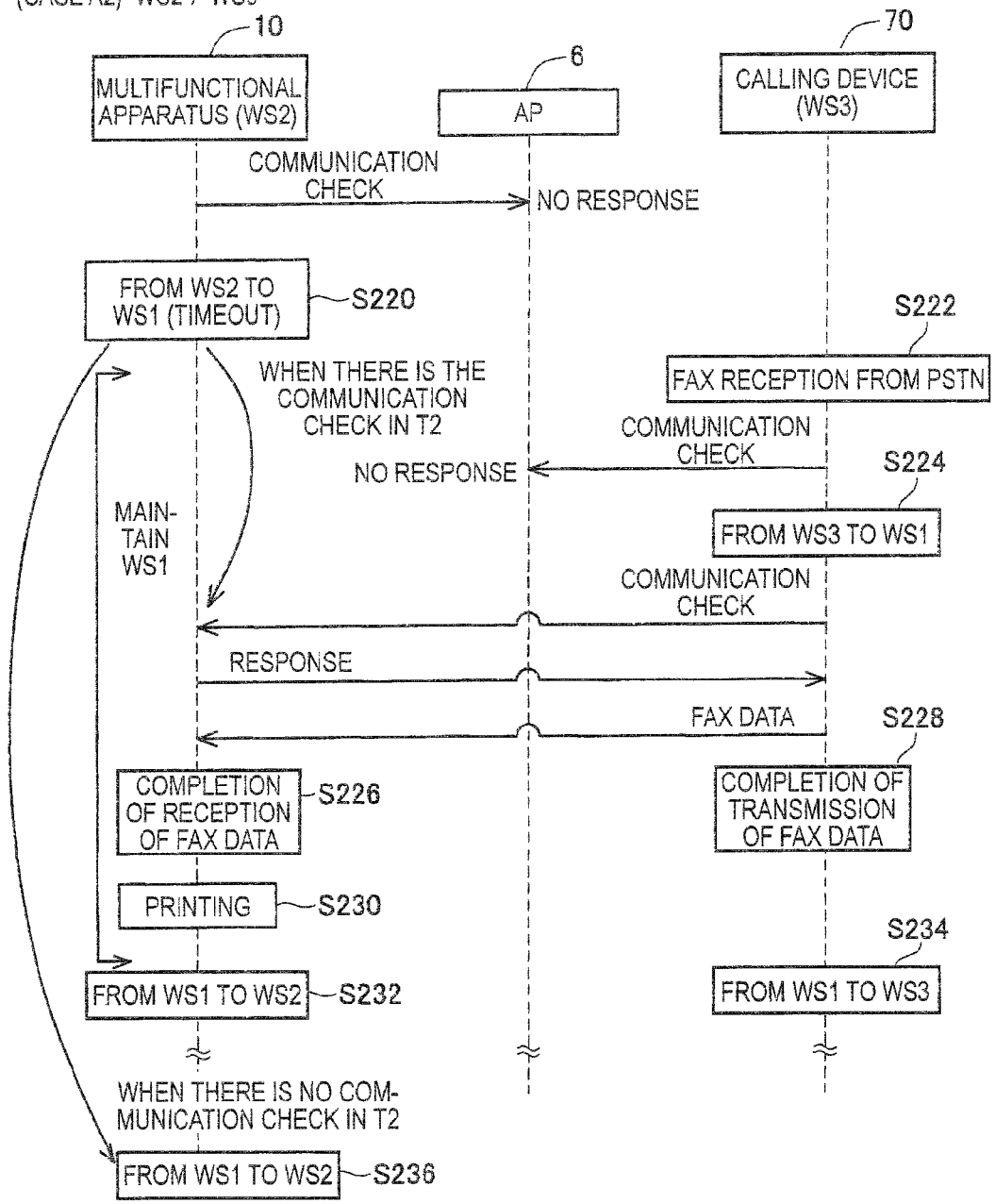
FIG. 5 illustrates an example in which the calling device receives FAX data through the PSTN when different wireless settings are set up for the multifunctional apparatus and the calling device.

In the meantime, as shown in FIG. 5, in the case A2, even when the check unit 52 of the multifunctional apparatus 10 wirelessly transmits the communication check to the calling device 70 by using the designated setting WS2 (S10 of FIG. 2), it is not possible to receive a response to the communication check (NO in step S14 of FIG. 2). In this case, in step S220, the change unit 54 of the multifunctional apparatus 10 changes the current wireless setting of the multifunctional apparatus 10 from the designated setting WS2 to the initial setting WS1 (S18 of FIG. 2). Then, the multifunctional apparatus 10 determines whether the communication check is received from the calling device 70 (NO in step S22 of FIG. 2, NO in step S26 and NO in step S32) until the value of the initial timer exceeds the predetermined value T2. In the meantime, when the multifunctional apparatus 10 receives the communication check from the calling device 70 (YES in step S22 of FIG. 2) until the value of the initial timer exceeds the predetermined value T2, the multifunctional apparatus 10 prints the FAX data received from the calling device 70 and then returns the current wireless setting of the multifunctional apparatus 10 to the designated setting WS2 from the initial setting WS1. That is, the initial setting WS1 is maintained as the current wireless setting of the multifunctional apparatus 10 until the value of the initial timer exceeds the predetermined value T2 or until the FAX data of a printing target is completely printed.

When the FAX data of a printing target is received through the PSTN 8 in step S222, even though the check unit 102 of the calling device 70 wirelessly transmits the communication check to the multifunctional apparatus 10 by using the designated setting WS3 (S144 of FIG. 3), it is not possible to receive a response to the communication check (NO in step S146 of FIG. 3). In this case, in step S224, the change unit 104 of the calling device 70 changes the current wireless setting of the calling device 70 from the designated setting WS3 to the initial setting WS1 (S150 in FIG. 3). Then, the check unit 102 of the calling device 70 wirelessly transmits the communication check to the multifunctional apparatus 10 by using the initial setting WS1 (S152 of FIG. 3). Since the same initial setting WS1 is set up for each of the multifunctional apparatus 10 and the calling device 70, the multifunctional apparatus 10 receives the communication check and transmits a response thereto without through the AP6 (S24 of FIG. 2) and the calling device 70 receives the response without through the AP 6 (YES in step S154 of FIG. 3).

Then, the transmission unit 106 of the calling device 70 wirelessly transmits the FAX data of a printing target to the multifunctional apparatus 10 by using the initial setting WS1 (S158 if FIG. 3). The reception unit 58 of the multifunctional apparatus 10 wirelessly receives the FAX data of a printing target without through the AP 6 by using the initial setting WS1 (YES in step S26 of FIG. 2). As a result, the transmission and reception of the FAX data of a printing target are completed (S226, step S228). Then, in step S230, an image that is expressed by the FAX data of a printing target is printed.

Then, in step S232, the change unit 54 of the multifunctional apparatus 10 changes the current wireless setting of the multifunctional apparatus 10 from the initial setting WS1 to the designated setting WS2 (S30 of FIG. 2) when the reception of the FAX data of a printing target is completed (more specifically, when the printing is completed). Thereby, the multifunctional apparatus 10 can again perform the wireless communication with another device (for example, PC 4) through the AP 6 by using the designated setting WS1. Also, in step S234, the change unit 104 of the calling device 70 changes the current wireless setting of the calling device 70 from the initial setting WS1 to the designated setting WS3 (S160 of FIG. 3) when the transmission of the FAX data of a printing target is completed. Thereby, the wireless setting of the calling device 70 is returned to the designated setting WS3 before the change, which is designated by the user.

In the meantime, the configuration that the value of the initial timer exceeds the predetermined value T2 (YES in step S32 of FIG. 2) means the following. That is, until the value of the initial timer exceeds the predetermined value T2, the multifunctional apparatus 10 does not receive the communication check (hereinafter, referred to as "specific communication check") that the calling device 70 transmits to the multifunctional apparatus 10 when the calling device receives the FAX data of a printing data. Accordingly, it can be said that the process of step S32 of FIG. 2 is a process in which the determination unit 62 of the multifunctional apparatus 10 determines whether the multifunctional apparatus receives the specific communication check from the calling device 70 until the value of the initial timer exceeds the predetermined value T2. When it is determined that the specific communication check is not received (YES in step S32 of FIG. 2), the change unit 54 of the multifunctional apparatus 10 changes the current wireless setting of the multifunctional apparatus 10 from the initial setting WS1 to the designated setting WS2 (S34 of FIG. 2), as shown in step S236 of FIG. 5. According to this configuration, it is possible to suppress the initial setting WS1 from being continuously maintained as the current wireless setting of the multifunctional apparatus 10. As a result, the multifunctional apparatus 10 can perform the wireless communication with another device (for example, PC 4) through the AP 6 by using the designated setting WS2.

(Effects of Case A)

As you can see from the case A2, the multifunctional apparatus 10 repeatedly checks whether the communication with the calling device 70 can be performed by using the current wireless setting (i.e., designated setting WS2) of the multifunctional apparatus 10. When it is checked that it is not possible to perform the communication with the calling device 70, the multifunctional apparatus 10 changes the current wireless setting from the designated setting WS2 to the initial setting WS1. On the other hand, when the FAX data of a printing target is to be transmitted to multifunctional apparatus 10 (YES in step S140 of FIG. 3), the calling device 70 checks whether the communication with the multifunctional apparatus 10 can be performed by using the current wireless setting (i.e., designated setting WS3) of the calling device 70. When it is checked that the communication with the multifunctional apparatus 10 is impossible, the calling device 70 changes the current wireless setting from the designated setting WS3 to the initial setting WS1. As a result, since the same initial setting WS1 is set up for each of the multifunctional apparatus 10 and the calling device 70, the calling device 70 can wirelessly transmit the FAX data of a printing target to the multifunctional apparatus 10 by using the current wireless setting after the changing (i.e., initial setting WS1) and the multifunctional apparatus 10 can wirelessly receive the FAX data of a printing target from the calling device 70 by using the current wireless setting after the changing (i.e., initial setting WS1). Accordingly, it is possible to suppress the case, in which the multifunctional apparatus 10 and the calling device 70 cannot appropriately perform the wireless communication each other, from occurring.

(Case B)

Figure 6:
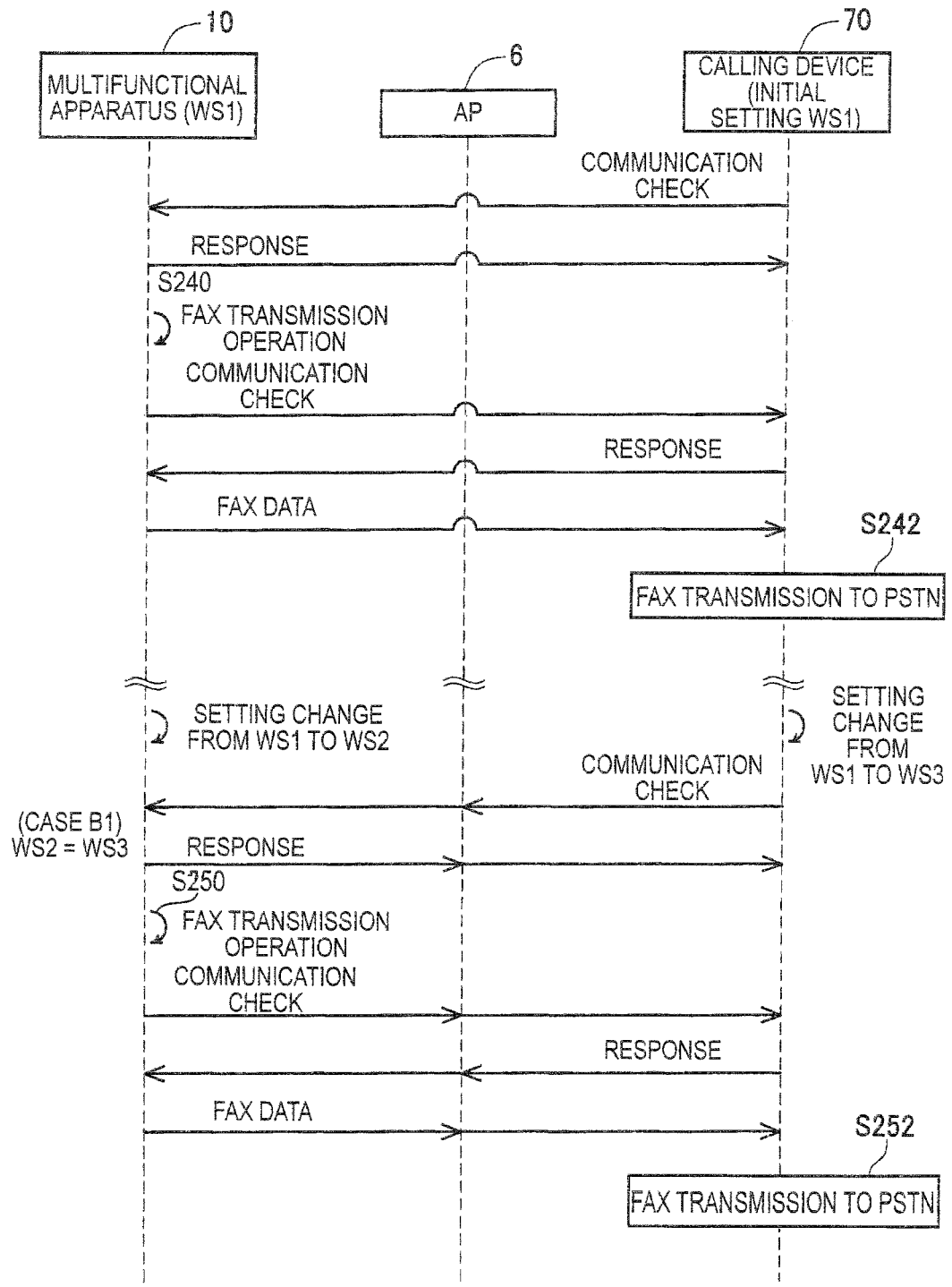
FIG. 6 illustrates an example in which a FAX transmission operation is executed in the multifunctional apparatus when the same wireless setting is set up for both the multifunctional apparatus and the calling device.

In the below, a case B where the FAX data of a transmission target is transmitted through the PSTN 8 is described with reference to FIGS. 6 and 7. As shown in FIG. 6, the check unit 102 of the calling device 70 repeats to wirelessly transmit the communication check to the multifunctional apparatus 10 by using the initial setting WS1 (S110 of FIG. 3). Since the same initial setting WS1 is set up for each of the multifunctional apparatus 10 and the calling device 70, the multifunctional apparatus 10 receives the communication check and transmits a response thereto without through the AP 6 (S24 of FIG. 2), and the calling device 70 receives the response without through the AP 6 (YES in step S114 of FIG. 3). As a result, the initial setting WS1 is maintained as the current wireless setting of the calling device 70.

When the FAX transmission operation is executed in step S240 (YES in step S40 of FIG. 2), the check unit 52 of the multifunctional apparatus 10 wirelessly transmits the communication check to the calling device 70 by using the initial setting WS1 (S44 of FIG. 2). Since the same initial setting WS1 is set up for each of the multifunctional apparatus 10 and the calling device 70, the calling device 70 receives the communication check and transmits a response thereto (S124 of FIG. 3) without through the AP 6, and the multifunctional apparatus 10 receives the response without through the AP 6 (YES in step S46 of FIG. 2).

Then, the transmission unit 106 of the multifunctional apparatus 10 wirelessly transmits the FAX data of a transmission target to the calling device 70 by using the initial setting WS1 (S58 of FIG. 2). The reception unit 108 of the calling device 70 wirelessly receives the FAX data of a transmission target without through the AP 6 by using the initial setting WS1 (YES in step S126 of FIG. 3). Then, in step S242, the FAX communication unit 110 of the calling device 70 transmits the FAX data of a transmission target through the PSTN 8 (S128 of FIG. 3).

When a user designates the wireless setting of the multifunctional apparatus 10 as the designated setting WS2 and appropriately designates the wireless setting of the calling device 70 as the same designated setting WS3 as the designated setting WS2, a following case B1 is performed. To the contrary, when the user erroneously designates the wireless setting of the calling device 70 as the designated setting WS3 different from the designated setting WS2, a case B1 of FIG. 7 is performed.

(Case B1)

In the case B1, the multifunctional apparatus 10 and the calling device 70 can appropriately perform the wireless communication through the AP 6 by using the designated setting WS2, WS3. Accordingly, when the FAX transmission operation is executed in step S250, the communication check, the response to the communication check and the FAX data of a transmission target are appropriately communicated through the AP 6 between the multifunctional apparatus 10 and the calling device 70. As a result, the FAX data of a transmission target is transmitted through the PSTN 8 in step S252.

(Case B2)

Figure 7:
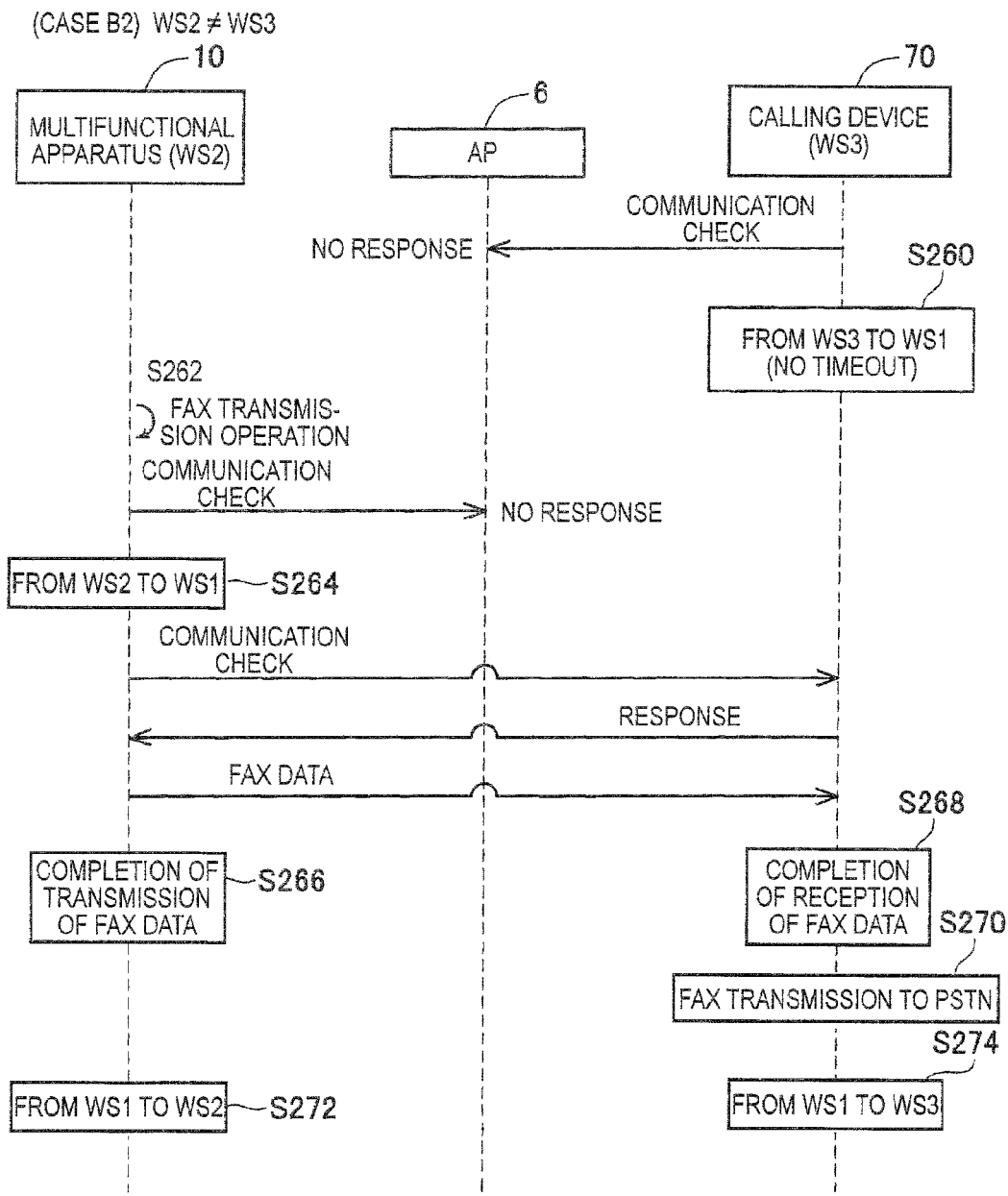
FIG. 7 illustrates an example in which a FAX transmission operation is executed in the multifunctional apparatus when different wireless settings are set up for the multifunctional apparatus and the calling device.

In the meantime, as shown in FIG. 7, in the case B2, even when the check unit 102 of the calling device 70 wirelessly transmits the communication check to the multifunctional apparatus 10 by using the designated setting WS3 (S110 of FIG. 3), it is not possible to receive a response to the communication check (NO in step S114 of FIG. 3). In this case, in step S260, the change unit 104 of the calling device 70 changes the current wireless setting of the calling device 70 from the designated setting WS3 to the initial setting WS1 (S118 of FIG. 3). In the meantime, the initial timer is not used in the calling device 70. That is, when the wireless setting is changed to the initial setting WS1 (S118 of FIG. 3), the calling device 70 maintains the initial setting WS1 as the current wireless setting, until the FAX data of a transmission target is received. Thereby, the multifunctional apparatus 10 can transmit the FAX data more securely. This is because it is possible to suppress the wireless setting of the multifunctional apparatus 10 and the calling device 70 from being crossed (different), compared to the configuration in which the wireless setting of the calling device 70 is returned from the initial setting WS1 to the designated setting WS3 after a predetermined time period elapses. In the meantime, although there is a possibility that the initial setting WS1 will be maintained for a long time as the current wireless setting of the calling device 70, since it is not necessary for the calling device 70 to perform the wireless communication with the other device (for example, PC 4) different from the multifunctional apparatus 10, a problem does not occur.

When the FAX transmission operation is executed in step S262, even though the check unit 102 of the multifunctional apparatus 10 wirelessly transmits the communication check to the calling device 70 by using the designated setting WS2 (S44 of FIG. 2), it is not possible to receive a response to the communication check (NO in step S46 of FIG. 2). In this case, in step S264, the change unit 54 of the multifunctional apparatus 10 changes the current wireless setting of the multifunctional apparatus 10 from the designated setting WS2 to the initial setting WS1 (S50 of FIG. 2). Then, the check unit 52 of the multifunctional apparatus 10 wirelessly transmits the communication check to the calling device 70 by using the initial setting WS1 (S52 of FIG. 2). Since the same initial setting WS1 is set up for each of the multifunctional apparatus 10 and the calling device 70, the calling device 70 receives the communication check and transmits a response thereto without through the AP 6 (S124 of FIG. 3) and the multifunctional apparatus 10 receives the response without through the AP 6 (YES in step S54 of FIG. 2).

Then, the transmission unit 56 of the multifunctional apparatus 10 wirelessly transmits the FAX data of a transmission target to the calling device 70 by using the initial setting WS1 (S58 of FIG. 2). The reception unit 108 of the calling device 70 wirelessly receives the FAX data of a transmission target without through the AP 6 by using the initial setting WS1 (YES in step S126 of FIG. 3). As a result, the transmission and reception of the FAX data of a transmission target are completed (S226, step S228). Then, in step S270, the FAX communication unit 110 of the calling device 70 transmits the FAX data of a transmission target through the PSTN 8 (S128 of FIG. 3).

Then, in step S272, the change unit 54 of the multifunctional apparatus 10 changes the current wireless setting of the multifunctional apparatus 10 from the initial setting WS1 to the designated setting WS2 (S60 of FIG. 2) when the transmission of the FAX data of a transmission target is completed. Thereby, the multifunctional apparatus 10 can again perform the wireless communication with another device (for example, PC 4) through the AP 6 by using the designated setting WS2. Also, in step S274, the change unit 104 of the calling device 70 changes the current wireless setting of the calling device 70 from the initial setting WS1 to the designated setting WS3 (S130 of FIG. 3) when the reception of the FAX data of a transmission target is completed. Accordingly, the wireless setting of the calling device 70 is returned to the designated setting WS3 before the change, which is designated by the user.

(Effects of Case B)

As you can see from the case B2, the calling device 70 repeatedly checks whether the calling device can perform the communication with the multifunctional apparatus 10 by using the current wireless setting designated setting WS3) of the calling device 70. When it is checked that it is not possible to perform the communication with the multifunctional apparatus 10, the calling device 70 changes the current wireless setting from the designated setting WS3 to the initial setting WS1. On the other hand, when the FAX data of a transmission target is to be transmitted to the calling device 70 (YES in step S40 of FIG. 2), the multifunctional apparatus 10 checks whether the communication with the calling device 70 can be performed by using the current wireless setting (i.e., designated setting WS2) of the multifunctional apparatus 10. When it is checked that the communication with the calling device 70 is impossible, the multifunctional apparatus 10 changes the current wireless setting from the designated setting WS2 to the initial setting WS1. As a result, since the same initial setting WS1 is set up for each of the multifunctional apparatus 10 and the calling device 70, the multifunctional apparatus 10 can wirelessly transmit the FAX data of a transmission target to the calling device 70 by using the current wireless setting after the changing (i.e., initial setting WS1), and the calling device 70 can wirelessly receive the FAX data of a transmission target from the multifunctional apparatus 10 by using the current wireless setting after the changing (i.e., initial setting WS1). Accordingly, it is possible to suppress the case, in which the multifunctional apparatus 10 and the calling device 70 cannot appropriately perform the wireless communication each other, from occurring.

In the meantime, even though the designated setting WS2 and the designated setting WS3 are the same, when a distance between at least one of the multifunctional apparatus 10 and the calling device 70 and the AP 6 is so far, the multifunctional apparatus 10 and the calling device 70 may not perform the infrastructure wireless communication by using the designated setting WS2 and the designated setting WS3. Even in this case, the wireless settings of the multifunctional apparatus 10 and the calling device 70 are changed to the initial setting WS1 from the designated setting WS2 and the designated setting WS3. Thereby, the multifunctional apparatus 10 and the calling device 70 can perform the ad hoc wireless communication by using the initial setting WS1. Accordingly, the technologies of the above cases A and B can be applied not only to the cases A2, B2 in which it is not possible to perform the wireless communication because the designated setting WS2 and the designated setting WS3 are different but also to a case in which it is not possible to perform the wireless communication due to the provision environments of the multifunctional apparatus 10 and the calling device 70.

As you can see from the above descriptions, in the case A shown in FIGS. 4 and 5, the multifunctional apparatus 10 and the calling device 70 are examples of the "data reception apparatus" and the "data transmission apparatus", respectively. Accordingly, in the case A, the check unit 102 and the change unit 104 of the calling device 70 are examples of the "first check unit" and the "first change unit", respectively, and the check unit 52 and the change unit 54 of the multifunctional apparatus 10 are examples of the "second check unit" and the "second change unit", respectively. Also, in the case A, the initial setting WS1 is an example of the "first wireless setting", the designated setting WS2 is an example of the "second wireless setting of the data reception apparatus" and the designated setting WS3 is an example of the "second wireless setting of the data transmission apparatus."

Also, in the case B shown in FIGS. 6 and 7, the multifunctional apparatus 10 and the calling device 70 are examples of the "data transmission apparatus" and the "data reception apparatus", respectively. Accordingly, in the case B, the check unit 52 and the change unit 54 of the multifunctional apparatus 10 are examples of the "first check unit" and the "first change unit", respectively, and the check unit 102 and the change unit 104 of the calling device 70 are examples of the "second check unit" and the "second change unit", respectively. Also, in the case B, the initial setting WS1 is an example of the "first wireless setting", the designated setting WS2 is an example of the "second wireless setting of the data transmission apparatus" and the designated setting WS3 is an example of the "second wireless setting of the data reception apparatus."

Although the illustrative cases of the present disclosure have been specifically described, they are just exemplary and are not construed to limit the scope of right. The technologies defined in the present disclosure encompass the various modifications and changes to the above exemplary embodiments. For example, following modified embodiments may be adopted.

(1) In the above exemplary embodiments, the setting is changed from the ad hoc wireless setting WS1 to the infrastructure wireless settings WS2, WS3. However, the technology of the above exemplary embodiments can be also applied to a configuration in which the setting is changed from the ad hoc wireless setting WS1 to the ad hoc wireless setting. Also, it can be applied to a configuration in which the setting is changed from the infrastructure wireless setting WS1 to the infrastructure wireless setting or ad hoc wireless setting. That is, generally speaking, the "first wireless setting" may be the ad hoc wireless setting or infrastructure wireless setting. Also, the "first wireless setting" is not limited to the wireless setting that is previously set at the time of shipment and may be the ad hoc wireless setting that is set by a user and may be the infrastructure wireless setting that is set by a user. Likewise, the "second wireless setting" may be the ad hoc wireless setting or infrastructure wireless setting. Also, the "first wireless setting" and the "second wireless setting" are the wireless setting of the same mode and may be the wireless settings of different modes.

(2) In the above exemplary embodiments, the data of a communication target, which is communicated between the multifunctional apparatus 10 and the calling device 70, is the FAX data. That is, generally speaking, the "specific data" includes the FAX data. However, the "specific data" may include voice data (for example, voice data of an answer phone), image data other than the FAX data, the other data (for example, text data) and the like.

(3) In the above exemplary embodiments, the multifunctional apparatus 10 and the calling device 70 are examples of the "data transmission apparatus" and the "data reception apparatus," However, The present disclosure is not limited thereto. For example, the "data transmission apparatus" and the "data reception apparatus" may be a personal computer (PC), respectively. In this case, in order to communicate data between a pair of PCs, the technology disclosed in the specification may be used. Also, for example, the "data transmission apparatus" may be a personal computer (PC) and the "data reception apparatus" may be a printer. In this case, the printing data for which the PC instructs the multifunctional apparatus 10 to execute a printing operation is an example of the "specific data."

(4) In the above exemplary embodiments, the respective units 52 to 62 and the respective units 102 to 110 are performed as the CPUs 32, 82 execute the programs. Instead of this, at least a part of the respective units 52 to 62 and the respective units 102 to 110 may be performed by hardware such as logic circuit and the like.

[JP0100]

(5) In addition, the calling device 70 may be configured by one device or a plurality of separate devices. Specifically, the calling device 70 may be configured by a child apparatus having the microphone 72 and the speaker 74 and a charger having the PSTN interface 76, the wireless interface 78 and the control unit 80. Generally speaking, the "data transmission apparatus" and/or the "data reception apparatus" may be configured by one device or a plurality of separate devices.

[JP0101]

In addition, the technical elements described and shown in the specification and the drawings provide the technical usefulness independently or in combination and are not limited to a combination of the disclosure at the time of filing this application. Further, the technologies exemplified in the specification or drawings achieve a plurality of purposes at the same time and have a technical usefulness inasmuch as one purpose is realized.

What is claimed is:

1. A data transmission apparatus that wirelessly transmits data to a data reception apparatus storing a first wireless setting, the data transmission apparatus comprising:
   a memory that stores the first wireless setting;
   a first check unit that, when specific data is to be transmitted to the data reception apparatus, executes a first check process checking whether the data transmission apparatus is able to perform communication with the data reception apparatus by using a second wireless setting, which is a wireless setting being used by the data transmission apparatus, and which is different from the first wireless setting;
   a first change unit that, when it is checked in the first check process that the data transmission apparatus is not able to perform communication with the data reception apparatus, changes the wireless setting being used by the data transmission apparatus from the second wireless setting to the first wireless setting; and
a transmission unit that wirelessly transmits the specific data to the data reception apparatus by using the first wireless setting as the wireless setting being used by the data transmission apparatus after the wireless setting being used is changed.

2. The data transmission apparatus according to claim 1, further comprising:
an interface that is connected to a public switched telephone network (PSTN); and
a FAX communication unit that uses the interface to perform communication of FAX data through the PSTN,
wherein the specific data includes specific FAX data that the FAX communication unit receives through the PSTN.

3. The data transmission apparatus according to claim 2,
wherein the data reception apparatus comprises a provision unit that provides a specific image expressed by the specific FAX data, and
wherein the data transmission apparatus is an auxiliary apparatus of the data reception apparatus, which does not have a function to provide the user with an image expressed by FAX data.

4. The data transmission apparatus according to claim 1,
wherein the data reception apparatus comprises:
an interface that is connected to a public switched telephone network (PSTN); and
a FAX communication unit that uses the interface to perform communication of FAX data through the PSTN,
wherein the specific data includes specific FAX data that the data reception apparatus is to be transmit through the PSTN.

5. The data transmission apparatus according to claim 4, further comprising
a scan execution unit that scans a specific document to generate the specific FAX data,
wherein the data reception apparatus is an auxiliary apparatus of the data transmission apparatus, which does not have a function to scan a document to generate FAX data.

6. The data transmission apparatus according to claim 1,
wherein the first change unit maintains the first wireless setting, as the wireless setting being used by the data transmission apparatus, until at least a specific timing after the first change unit changes the wireless setting being used by the data transmission apparatus from the second wireless setting to the first wireless setting, and
wherein the specific timing is a timing at which the transmission of the specific data to the data reception apparatus is completed.

7. The data transmission apparatus according to claim 1,
wherein the first change unit changes the wireless setting being used by the data transmission apparatus from the first wireless setting to the second wireless setting, when the transmission of the specific data to the data reception apparatus is completed.

8. The data transmission apparatus according to claim 1,
wherein the first wireless setting is a wireless setting of an ad hoc mode, in which the data transmission apparatus and the data reception apparatus directly perform wireless communication without through an access point.

9. A data reception apparatus that wirelessly receives data from a data transmission apparatus storing a first wireless setting, the data reception apparatus comprising:

a memory that stores the first wireless setting;
a second check unit that repeatedly executes a second check process checking whether the data reception apparatus is able to perform communication with the data transmission apparatus by using a second wireless setting, which is a wireless setting being used by the data reception apparatus, and which is different from the first wireless setting;
a second change unit that, when it is checked in the second check process that the data reception apparatus is not able to perform communication with the data transmission apparatus, changes the wireless setting being used by the data reception apparatus from the second wireless setting to the first wireless setting; and
a reception unit that wirelessly receives specific data from the data transmission apparatus by using the first wireless setting as the wireless setting being used by the data reception apparatus after wireless setting being used is changed.

10. The data reception apparatus according to claim 1, further comprising:
an interface that is connected to a public switched telephone network (PSTN); and
a FAX communication unit that uses the interface to perform communication of FAX data through the PSTN,
wherein the specific data includes specific FAX data that the data reception apparatus is to be transmit through the PSTN.

11. The data reception apparatus according to claim 10,
wherein the data transmission apparatus comprises a scan execution unit that scans a specific document to generate the specific FAX data, and
wherein the data reception apparatus is an auxiliary apparatus of the data transmission apparatus, which does not have a function to scan a document to generate FAX data.

12. The data reception apparatus according to claim 9,
wherein the data transmission apparatus comprises:
an interface, that is connected to a public switched telephone network (PSTN); and
a FAX communication unit that uses the interface to perform communication of FAX data through the PSTN,
wherein the specific data includes specific FAX data that the data transmission apparatus receives through the PSTN.

13. The data reception apparatus according to claim 12, further comprising
a provision unit that provides a specific image expressed by the specific FAX data
wherein the data transmission apparatus is an auxiliary apparatus of the data reception apparatus, which does not have a function to provide the user with an image expressed by FAX data.

14. The data reception apparatus according to claim 9,
wherein, when the specific data is to be transmitted to the data reception apparatus, the data transmission apparatus wirelessly transmits a signal checking whether the data transmission apparatus is able to perform communication with the data reception apparatus by using the wireless setting being used by the data transmission apparatus,
wherein the data reception apparatus further comprises a determination unit that determines whether the signal is wirelessly received from the data transmission apparatus in a predetermined time period after the wireless setting being used by the data reception apparatus is changed from the second wireless setting to the first wireless setting, and wherein when it is determined that the signal is not received in the predetermined time period, the second change unit further changes the wireless setting being used by the data reception apparatus from the first wireless setting to the second wireless setting after the predetermined time period elapses.

15. The data reception apparatus according claim 9,
wherein the second change unit maintains the first wireless setting as the wireless setting being used by the data reception apparatus, until at least a specific timing after the second change unit changes the wireless setting being used by the data reception apparatus from the second wireless setting to the first wireless setting, and wherein the specific timing is a timing at which the reception of the specific data from the data transmission apparatus is completed.

16. The data reception apparatus according to claim 9, wherein, when the reception of the specific data from the data transmission apparatus is completed, the second change unit further changes the wireless setting being used by the data reception apparatus from the first wireless setting to the second wireless setting.

17. The data reception apparatus according to claim 9, wherein the first wireless setting is a wireless setting of an ad hoc mode, in which the data transmission apparatus and the data reception apparatus directly perform wireless communication without through an access point.

* * * * *